US010133722B2

(12) United States Patent
Sjolander et al.

(10) Patent No.: US 10,133,722 B2
(45) Date of Patent: Nov. 20, 2018

(54) UPDATING PAGE TEMPLATES PRESENTING CONTENT FROM A DIGITAL MAGAZINE IN A NATIVE APPLICATION

(71) Applicant: Flipboard, Inc., Palo Alto, CA (US)

(72) Inventors: Emil Sjolander, London (GB); Noah Gilmore, Berkeley, CA (US)

(73) Assignee: Flipboard, Inc., Palo Alto, CA (US)

( * ) Notice: Subject to any disclaimer, the term of this patent is extended or adjusted under 35 U.S.C. 154(b) by 0 days.

(21) Appl. No.: 15/139,289

(22) Filed: Apr. 26, 2016

(65) Prior Publication Data

US 2017/0308518 A1    Oct. 26, 2017

(51) Int. Cl.
*G06F 17/00* (2006.01)
*G06F 17/24* (2006.01)
*G06F 17/21* (2006.01)
*H04L 29/08* (2006.01)

(52) U.S. Cl.
CPC .......... *G06F 17/248* (2013.01); *G06F 17/212* (2013.01); *H04L 67/06* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 2009/0172005 A1* | 7/2009 | LaToza ................ G06F 17/248 |
| 2011/0016194 A1* | 1/2011 | Von Haden ............ H04L 67/06 | 709/219 |
| 2011/0060727 A1* | 3/2011 | Koul ...................... H04L 67/02 | 707/689 |
| 2013/0024757 A1* | 1/2013 | Doll ...................... G06F 17/212 | 715/204 |
| 2013/0145251 A1* | 6/2013 | Jureidini .......... G06F 17/30896 | 715/234 |
| 2014/0108503 A1* | 4/2014 | Haykal .................. H04L 67/02 | 709/203 |
| 2014/0351268 A1* | 11/2014 | Weskamp ............ G06F 17/217 | 707/748 |
| 2015/0019957 A1* | 1/2015 | Ying ..................... G06F 17/248 | 715/243 |
| 2016/0132472 A1* | 5/2016 | Campbell ............ G06F 17/248 | 715/229 |

* cited by examiner

*Primary Examiner* — Howard Cortes
(74) *Attorney, Agent, or Firm* — Fenwick & West LLP

(57) ABSTRACT

An application associated with a digital magazine server and executing on a client device uses one or more dynamic page templates specifying the layout and formatting of content from the digital magazine server to generate pages of content for presentation to a user. To modify presentation of pages of content, the application receives dynamic page templates from the digital magazine server that replace or modify dynamic page templates previously stored on the client device executing the application. The application may request dynamic page templates from the digital magazine server when certain conditions are satisfied in some embodiments. Alternatively, the digital magazine server determines when to communicate dynamic page templates to the client device executing the application.

18 Claims, 7 Drawing Sheets

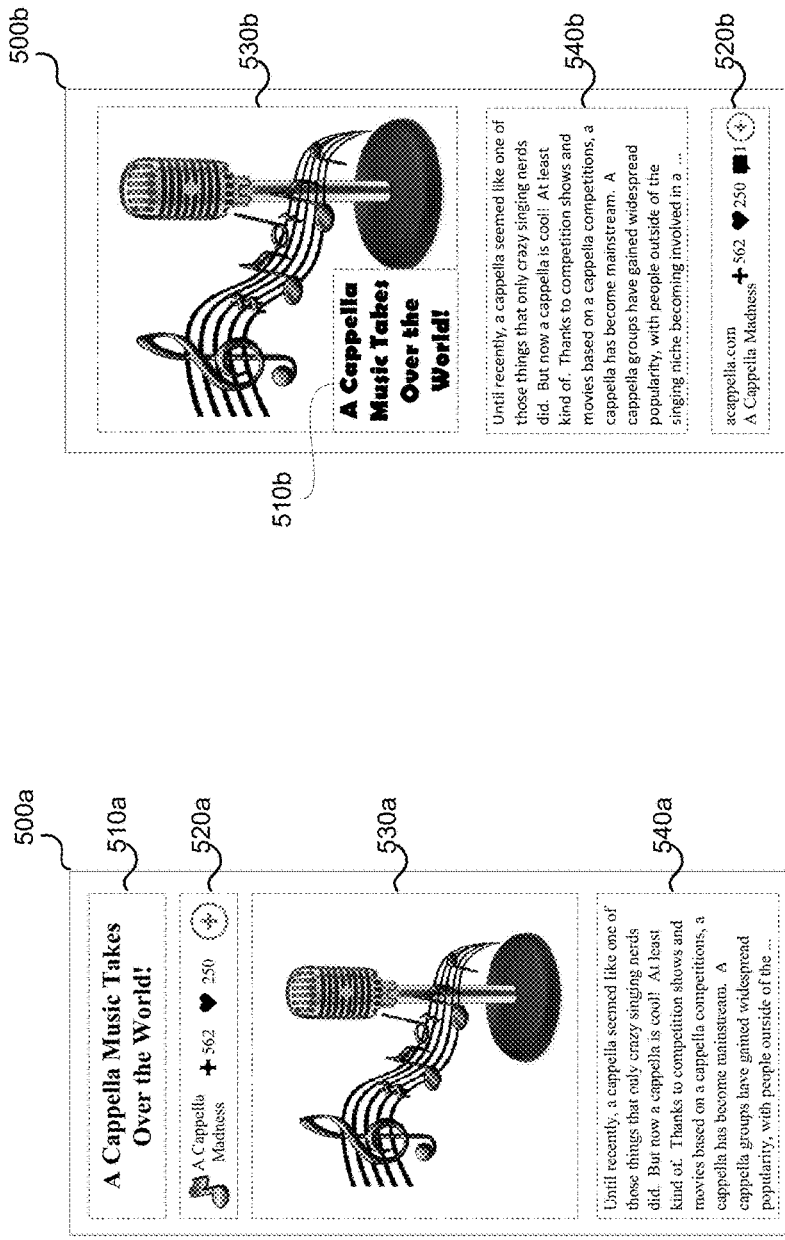

UPDATING PAGE TEMPLATES PRESENTING CONTENT FROM A DIGITAL MAGAZINE IN A NATIVE APPLICATION

BACKGROUND

This invention relates to updating a layout of a page including content on a native application, and more specifically to updating the layout of the page through dynamic page templates.

Online systems select and present various content items to their users to encourage the users to interact with the online system. For example, an online system selects various content items for presentation to a user based on information associated with the user and actions performed by the user that are identified to the online system. The online system communicates the selected content items to a client device for presentation to the user and receives information from the client device describing the user's interactions with the content items.

An online system may organize content into a digital magazine and present the content to the user. The digital magazine may include multiple pages, with different pages including different content items having different layouts relative to each other. Organization of content items in different pages of a digital magazine affects user interaction with the digital magazine. For example, if multiple pages of a digital magazine present content items in similar layouts to each other, user interaction with the digital magazine may decrease. Hence, changing or updating layouts of content items relative to each other in different pages of a digital magazine may increase user interaction with the digital magazine or encourage continued interaction with the digital magazine by a user.

However, digital magazines generated by an online system are often presented using a native application executing on a client device. A native application is an application designed or optimized for execution by a particular operating system or a particular device. Modifying layouts of content items relative to each other in pages of a digital magazine presented by a native application may involve changes to instructions comprising the native application itself. Modifying instructions of the native application itself may be limited in frequency, which may limit modification of presentation of content items in pages of the digital magazine presented by the native application.

SUMMARY

A digital magazine server retrieves content from one or more sources and generates a personalized, customizable digital magazine for a user based on the retrieved content. The generated digital magazine provided to a client device (such as a mobile communication device, tablet, computer, or any other suitable computing system) for presentation to a user of the digital magazine server. In various embodiments, the digital magazine server communicates the digital magazine to an application associated with the digital magazine server that is executing on a client device. The application presents the digital magazine to the user and receives actions from the user with content presented by the application. In various embodiments, the application associated with the digital magazine server presents content from the digital magazine to users via one or more pages, with each pages including one or more content items.

When presenting content from the digital magazine server, the application associated with the digital magazine server may use one or more page templates each describing a spatial arrangement ("layout") of content items from the digital magazine server relative to each other on a page for presentation by the client device executing the application associated with the digital magazine server. To increase user interaction with content presented by the application associated with the digital magazine server, the application may maintain one or more dynamic page templates to update the arrangement of content items relative to each other in one or more pages presented by the application without modifying the application itself. A dynamic page template specifies layout of content items relative to each other and formatting of various content items for presentation in a page of the digital magazine in the application. In some embodiments, content from the digital magazine server is a data dictionary defining variables that used by a dynamic page template to describe the layout and formatting of content items within a page of the digital magazine based on the dynamic page template. Dynamic page templates may be stored in a memory of a client device executing the application associated with the digital magazine server, allowing the dynamic page templates to be updated by replacing the dynamic page templates stored in the memory of the client device. In one embodiment, the application requests dynamic page templates from the digital magazine server when a user views or accesses content via the application and replaces dynamic page templates stored on the client device with page templates from the digital magazine server. Alternatively, the application associated with the digital magazine server replaces dynamic page templates stored by the client device on which the application executes after a stored dynamic page template has been used to present content at least a threshold number of times or after the stored dynamic page template has been stored on the client device for at least a threshold length of time. In other embodiments, the digital magazine server communicates dynamic page templates to the application for storage on the client device when the digital magazine server determines one or more criteria have been satisfied.

BRIEF DESCRIPTION OF THE DRAWINGS

FIGS. 5A-5B are examples of formatting content included in dynamic page templates, according to various embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
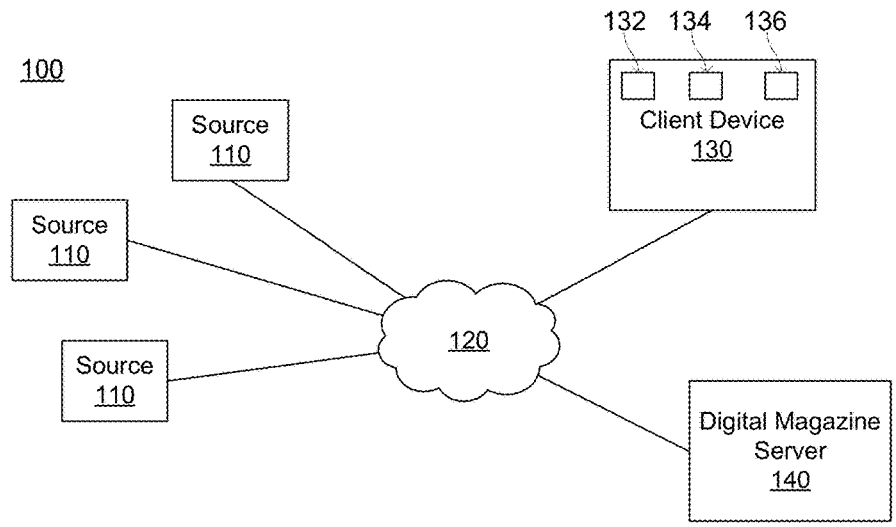
FIG. 1 is a block diagram of a system environment in which a digital magazine server operates, according to an embodiment.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) extensible markup language (XML) or JavaScript Object Notation (JSON). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 130 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The client device 130 executes an application 136 associated with the digital magazine server 140 that receives content form the digital magazine server 140 and presents the received content to a user associated with the client device 130. Additionally, the user performs various actions with the application 136, such as actions with content from the digital magazine server 140 presented by the application 136. For example, the application 136 presents various content items received from the digital magazine server 140 and receives actions from the user with one or more of the content items. Example actions by bye user with content items presented by the application 136 include: accessing a content item, viewing a content item, sharing a content item with another user of the digital magazine server 140, saving a content item to the client device 130, providing a comment associated with a content item, and providing a content item to the digital magazine server 140.

Additionally, the application 136 receives and maintains one or more dynamic page templates from the digital magazine server 140, as further described below in conjunction with FIGS. 2-7. When the application 136 receives content from the digital magazine server 140, the application 136 identifies a maintained dynamic page template and presents the content to the user based on layout and formatting information in the identified dynamic page template. For example, the digital magazine server 140 presents a page of a digital magazine in which content items from the digital magazine server 140 have positions relative to each other that are specified by the identified dynamic page template. As further described below in conjunction with FIG. 7, the application 136 may replace maintained dynamic page templates with additional dynamic page templates from the digital magazine server 140 or obtain additional dynamic page templates from the digital magazine server 140 to modify how content is presented by the application 136.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
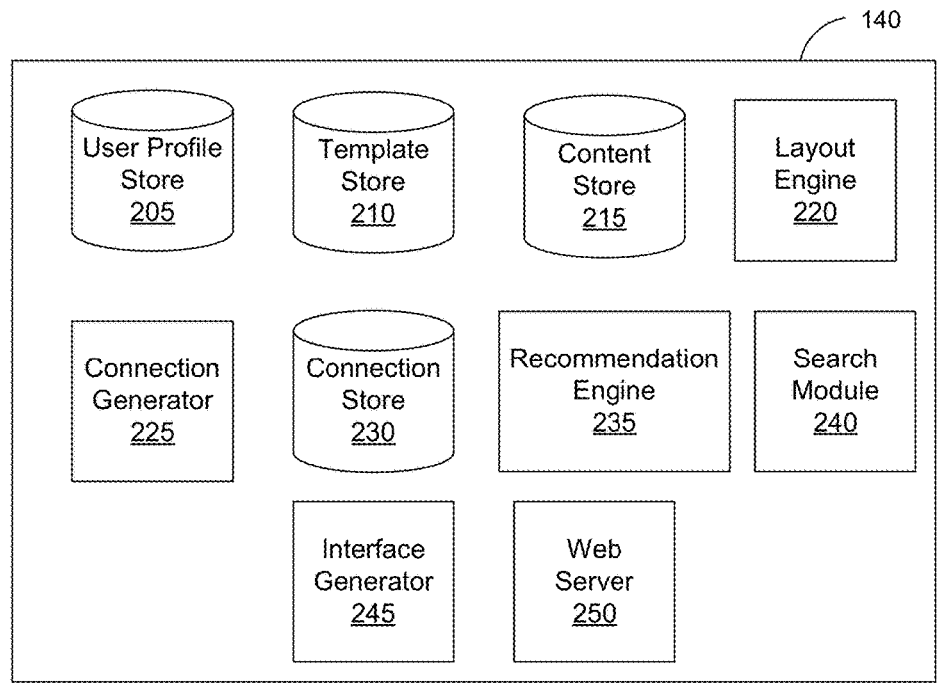
FIG. 2 is a block diagram of a digital magazine server, according to an embodiment.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, and U.S. patent application Ser. No. 13/938,227, filed on Jul. 9, 2013, each of which is hereby incorporated by reference in its entirety.

One or more page templates in the template store 210 are dynamic page templates, which may be used by the application 136 executing on the client device 130 to modify presentation of content items by the application 136 without updating the application 136 in its entirety. A dynamic page template may be a data dictionary identifying variables used by the dynamic page template specifying characteristics of data for presentation to a user. Dynamic page templates may be written in a templating language (e.g. JSON Template, LESS cascading style sheets) to combine formatting information in a dynamic page template with content to present the content in a format specified by the dynamic page template. A dynamic page template may specify a layout of slots on a page, where slots specify locations within the page where content items are presented, formatting of content presented within one or more slots, or a combination of layouts of slots on the page and formatting of content presented by different slots. For example, a dynamic page template identifies sizes of one or more slots within a page and placement of slots within the page relative to each other or relative to boundaries of the page, margins between one or more slots and one or more boundaries (e.g., edges) of the page, or spacing between different slots in the page. As an example, a dynamic page template partitions a page into a grid of slots and specifies dimensions of various slots in the grid.

The content store 215 stores objects that each represent various types of content. For example, the content store 215 stores content items received from one or more sources 110 within a threshold time of a current time. Examples of content items stored by the content store 215 include: a page post, a status update, an image, a photograph, a video, a link, an article, video data, audio data, a check-in event at a location, or any other type of content. A user may specify a section including content items having a common characteristic, and the common characteristic is stored in the content store 215 along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. Examples of using a page template to present content items are further described in U.S. patent application Ser. No. 13/187,840, filed on Jul. 21, 2011, U.S. patent application Ser. No. 13/938,223, filed on Jul. 9, 2013, and U.S. patent application Ser. No. 13/938,226, filed on Jul. 9, 2013, each of which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs. The adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a user and an additional user by analyzing the user's interactions with content items posted by the additional user, whether the content items are presented using the digital magazine server 140 or using another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 240 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 240 may present identified content items based on a ranking. One or more factors associated with the content items may be used to generate the ranking. Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. As further described below in conjunction with FIG. 7, the interface generate 245 may retrieve one or more dynamic page templates from the template store 210 and communicate the dynamic page templates to the client device 130, where the application 136 associated with the digital magazine server 140 presents content from the digital magazine server 140 based on one or more of the dynamic page templates. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, the interface generator 245 or the layout engine 220 select one or more dynamic page templates from the template store 210 and communicate the dynamic page templates to the client device 130, where the application 130 selects a dynamic page template and presents content to a user based on the selected dynamic page template.

Page Templates

Figure 3:
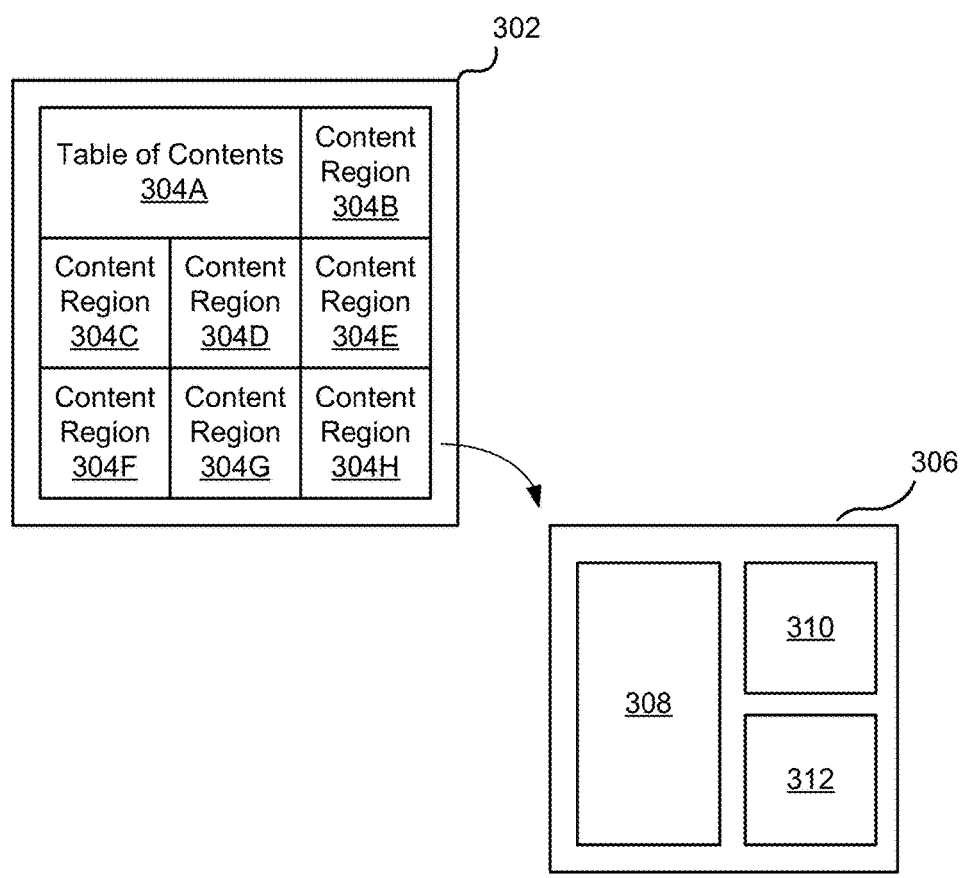
FIG. 3 is an example of presentation of content items in a digital magazine using a page template, according to an embodiment.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 302 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Dynamic Page Templates

Figure 4A:
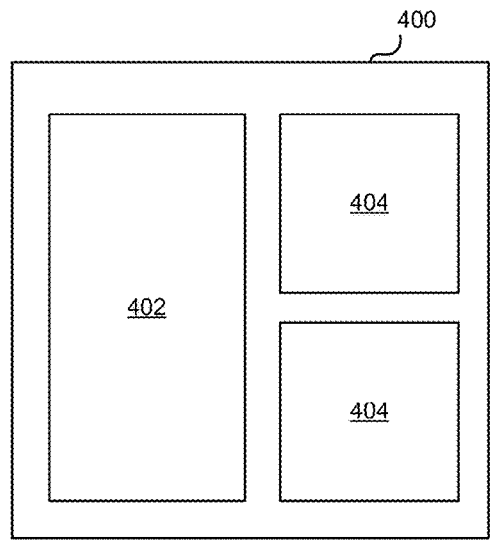
FIGS. 4A-4D are examples of dynamic page templates, according to various embodiments.

FIGS. 4A-4D show examples of dynamic page templates for presenting content in different locations relative to each other within a page. In FIGS. 4A-4D, different dynamic page templates partition a page into different slots in which content items are presented. For purposes of illustration, the dynamic page templates shown in FIGS. 4A-4D partition a page into a 6 by 6 grid and define slots occupying different portions of the grid. FIG. 4A shows a dynamic page template 400 including a slot 402 occupying three horizontal portions of the grid and six vertical portions of the grid, as well as two slots 404, 406 that each occupy three horizontal portions of the grid and three vertical portions of the grid. The dynamic page template 402 also positions slot 402 to the left of slots 404, 406 and positions slot 404 above slot 406.

Figure 4B:
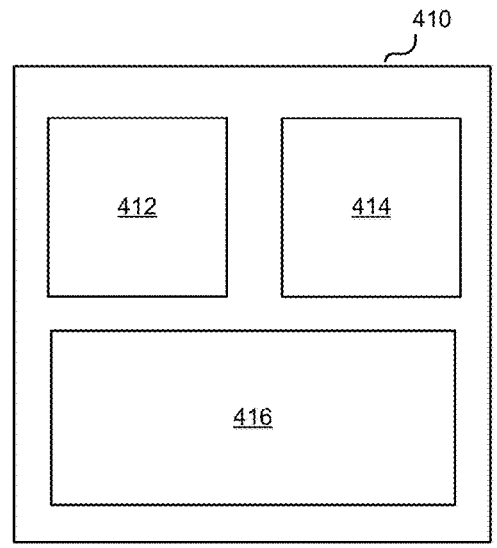
Figure 4C:
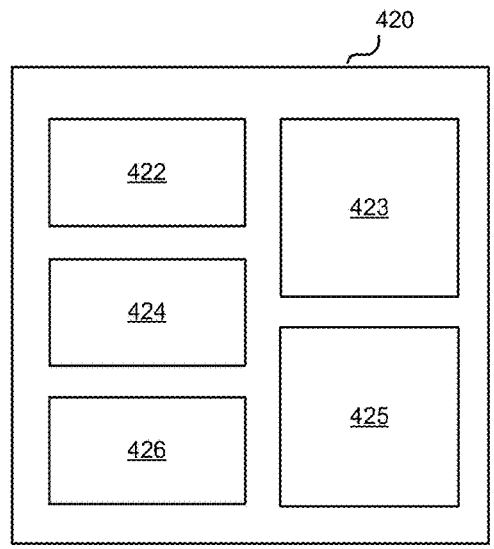
Figure 4D:
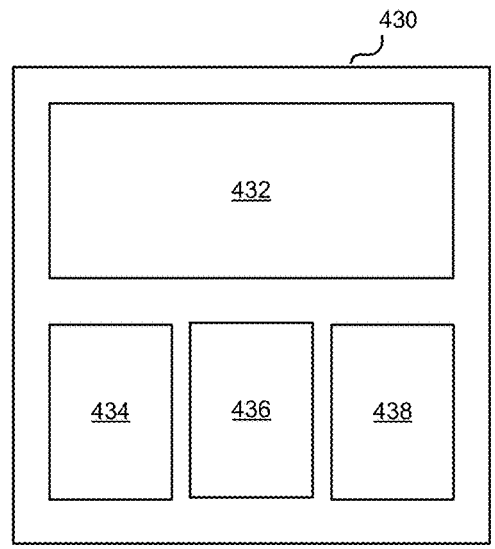

FIG. 4B shows a dynamic page template 410 including two slots 412, 414 each occupying three horizontal portions of the grid and three vertical portions of the grid as well as a slot 416 occupying six horizontal positions of the grid and three vertical positions of the grid. In the example of FIG. 4B, the dynamic page template 410 positions slots 412, 414 above slot 416. In FIG. 4C, a dynamic page template 420 includes three slots 422, 424, 426 each occupying three horizontal portions of the grid and two vertical portions of the grid, and two slots 423, 425, each occupying three horizontal portions of the grid and three vertical portions of the grid. The dynamic page template 420 in FIG. 4C also positions slots 422, 424, 426 to the left of slots 423, 425. FIG. 4D shows a dynamic page template 430 including a slot 432 occupying six horizontal portions of the grid and three vertical portions of the grid, as well as slots 434, 436, 438 that each occupy two horizontal portions of the grid and three vertical portions of the grid. In FIG. 4D, the slot 432 is positioned above slots 434, 436, 438.

Additionally, various dynamic page templates may specify presentation of content items within one or more slots. In various embodiments, a dynamic page template associates information with a slot identifying formatting and placement of components of a content item within the slot. For example, a dynamic page template includes information for sizing or placing a title of a content item within a slot, for sizing or placing information identifying an author or a source of a content item within a slot, or for sizing or placing images, icons, buttons, or previews of portions of a content item or other components of a content item within a slot. Additionally, the dynamic page template may identify components of a content item presented in a slot in some embodiments. For example, a dynamic page template specifies presentation of an image from a content item in a slot, while another dynamic page template specifies presentation of a portion of the content from a content item in a slot. If a dynamic page template specifies presentation of an image from the content item in a slot, the dynamic page template may also specify a height, a width, an aspect ratio, or other characteristics of the image (e.g., whether to fit, crop, stretch tile, or otherwise modify the image). Additionally, a dynamic page template may include formatting information for text from a content item presented in a slot (e.g., font style, font size, font type, etc.). A dynamic page template may also specify spacing between various components of a content item presented in a slot or spacing between components of a content item and one or more boundaries of the slot.

FIGS. 5A and 5B are examples of content presented in slots based on different dynamic page templates. In FIG. 5A, a dynamic page template includes information specifying a slot 600a that identifies presentation of a title 610a, an image 630a, and a preview of text in the content item 640a in the slot. Additionally, the slot 600a includes an interface bar 620a including additional information, such as an image associated with an author of the content item, an identifier of the author, an interface element for adding the content item to a digital magazine associated with a user, an indication of a number of users who added the content item to a digital magazine, a number of users who have indicated a preference for the content item, and an interface element for a user to indicate a preference for the content item. In the example of FIG. 5A, the dynamic page template includes information specifying that title 610a is centered proximate to an upper boundary of the slot 600a and presented in bold 12-point Times New Roman font and that the interface bar 620a is presented in the slot 600a below the title 610a and above the image 630a. In slot 600a, the preview of text in the content item 640a is presented below the image 630a, which is presented using a one-to-one aspect ratio that by fitting the largest dimension of the image 630a in the slot 600a and centering the image 630a in the slot 600a.

Figure 6A:
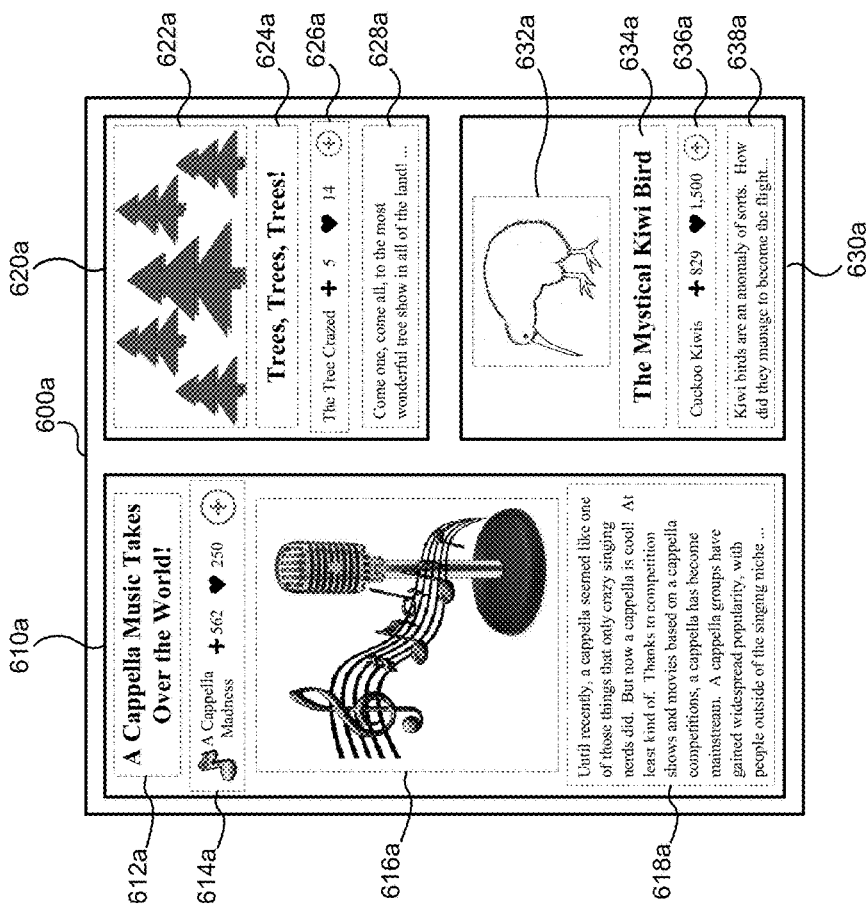
FIGS. 6A-6B are examples of pages of content generated using dynamic page templates, according to various embodiments.
Figure 6B:
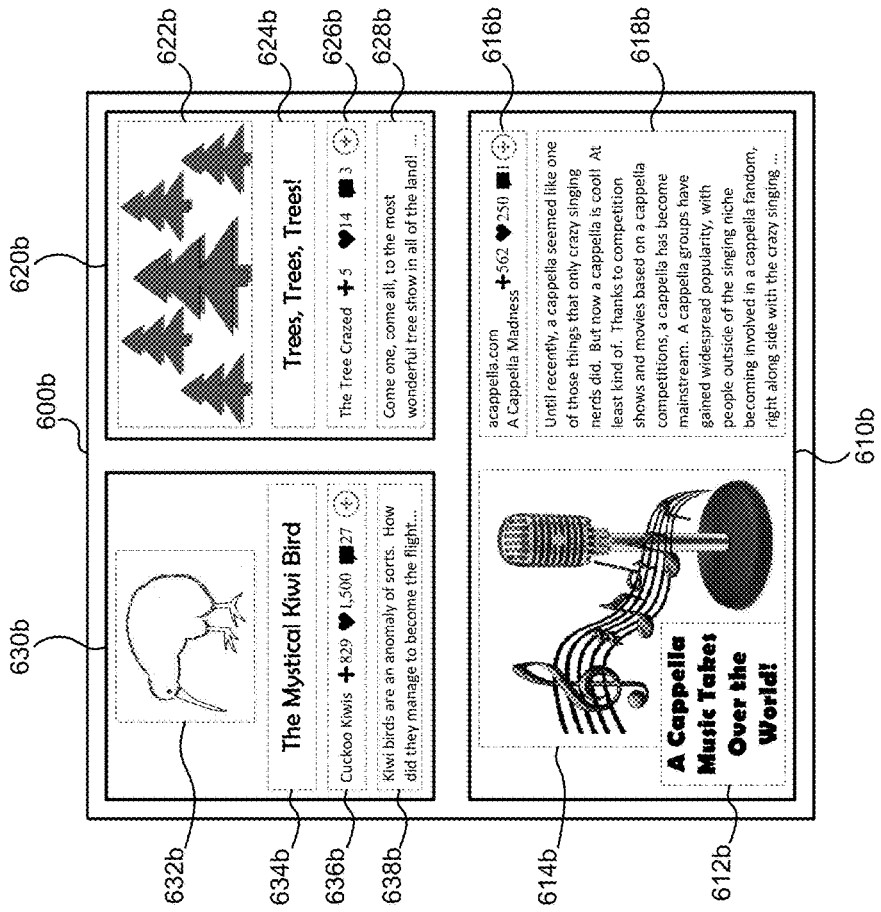

FIG. 6B shows a slot 600b specified by an alternative dynamic page template including a title 610b, an image 630b, and a preview of text in the content item 640b. The alternative dynamic page template specifies that the image 620b is centered proximate to an upper boundary of the slot 600b, but does not specify an aspect ratio for the image 620b. Additionally, the alternative dynamic page template specifies presentation of the title 610b at a bottom left corner of the image 620b and overlapping the image 610b, with the title 610b presented using center-aligned, 12-point BERLIN SANS FB® font. The alternative dynamic page template also specifies presentation of the preview of text in the content item 640b below the image 620b and the title 610b within the slot 600b. Text within the preview of text in the content item 640b is presented using left-aligned, 8-point CALIBRI® font. An interface bar 620b is also presented in the slot 600b below the preview of text in the content item 640b and includes information such as described above in conjunction with FIG. 6A.

Dynamic page templates may also specify combinations of positions of slots relative to each other and formatting of content within one or more slots. A dynamic page template may specify both positions of slots relative to each other within a page and formatting of content presented within slots on the page. Alternatively, a dynamic page template specifies positions of slots relative to each other within a page, while one or more additional page templates specify formatting of content within various slots on the page. An additional page templates specifying formatting content within a slot on page may be determined based on one or more characteristics of the slot, such as a size of slot. For example, a dynamic page template is selected to present content in slots on a page having a particular size, while an alternative page template is selected to present content in other slots on the page having a different size. A page template specifying positions of slots relative to each other within a page may identify additional page templates for presenting content via one or more slots within the page.

FIGS. 6A and 6B are example pages of content generated using different dynamic page templates. In the examples of FIGS. 6A and 6B, the example pages each include three content items. The digital magazine server 140 determines an order in which the content items are presented in some embodiments and communicates information describing the order along with the content items to an application 136 associated with the digital magazine server 140 executing on a client device 130 to present the content items.

In FIG. 6A, a page 600a including three slots 610a, 620a, 630a are shown. The application 136 generates the page 600a based on a dynamic page layout identifying slot 610a as proximate to a left border of the page 600a and occupying a left half of the page, while slots 620a, 630a are positioned to the right of slot 610a, with slot 620a positioned above slot 630a. In the example of FIG. 6A, slot 620a and slot 630a are the same size. Based on information associated with received content items and the dynamic page template, the application 136 identifies content items for presentation in each of slots 610a, 620a, 630a. In some embodiments, an order in which content items are presented received from the digital magazine server 140 is used along with characteristics of the slots 610a, 620a, 630a to associate content items with slots 610a, 620a, 630a. For example, content items with higher positions in the order are associated with larger slots 610a 620a, 630a, or content items associated with a source 110 with which a user has more frequently interacted are associated with larger slots 610a, 620a, 630a.

Additionally, the dynamic page template specifies presentation of content items within slots 610a, 620a, 630a, such as formatting information describing presentation of various components of content items within slots 610a, 620a, 630a. Alternatively, one or more additional dynamic page templates are associated with slots 610a, 620a, 630a, and specify presentation of components of content items within a corresponding slot 610a, 620a, 630a. In FIG. 6A, the page 600a presents a title 612a, an interface bar 614a, an image 616a, and a preview of text from a content item 618a associated with slot 610a, respectively, from an upper boundary of slot 610a to a lower boundary of slot 610a. The font size, font type, and placement of the title within slot 610a, the aspect ratio of the image 616a, and characteristics for presenting the preview of text from the content item 618 associated with slot 610a may also be specified by the dynamic page template or by an additional dynamic page template associated with slot 610a. Another page template may be associated with slot 620a and slot 620b that specifies formatting of components of content items presented via slot 620a and slot 620b. For example, slot 620a presents an image 622a, a title 624a, an interface bar 626a, and a preview of text from a content item 628a presented by slot 620a, respectively, from an upper boundary of slot 620a to a lower boundary of slot 620a. Similarly, based on the other page template, slot 630a presents an image 632a, a title 634a, an interface bar 636a, and a preview of text from a content item 638a presented by slot 630a, respectively, from an upper boundary of slot 630a to a lower boundary of slot 630a. As further described above in conjunction with FIGS. 5A and 5B, the other dynamic page template may specify formatting information of components of a content item presented via slot 620a or slot 630a (e.g., font size, font style, font placement, image aspect ratio, etc.). Additionally, a dynamic page template may identify information included in the interface bar 626a (e.g., whether an interface element for commenting on a content item or a number of users who have commented on a content item is presented by the interface bar 626a).

FIG. 6B shows another example of a page 600b including three slots 610b, 620b, 630b are shown. The application 136 generates the page 600b based on a dynamic page layout identifying slot 610b as proximate to a bottom border of the page and occupying a lower half of the page 600b, while slots 620b, 630b are positioned above slot 610b, with slot 620b positioned to the right of slot 630b. In the example of FIG. 6A, slot 620a and slot 630a are the same size. Based on information associated with received content items and the dynamic page template, the application 136 identifies content items for presentation in each of slots 610a, 620a, 630a. In some embodiments, an order in which content items are presented received from the digital magazine server 140 is used along with characteristics of the slots 610a, 620a, 630a to associate content items with slots 610a, 620a, 630a. For example, content items with higher positions in the order are associated with larger slots 610a 620a, 630a, or content items associated with a source 110 with which a user has more frequently interacted are associated with larger slots 610a, 620a, 630a.

In the example of FIG. 6B, an additional page template specifies presentation of content within slot 610a. A title 612b of a content item presented by slot 610b is presented as an overlay of a portion of an image 614b from the content item presented by slot 610b, while an interface bar 616b is presented within slot 610b to the right of image 614b. Additionally a preview of text from the content item 618b presented by slot 610b is presented in the slot 610b to the right of the image 614b and below the interface bar 616b. As described above in conjunction with FIGS. 5A and 5B, additional information describing presentation of content in slot 610b may also be specified by the additional page template (e.g., font size, font style, image aspect ratio, etc.).

In some embodiments, another dynamic page template describes presentation of content items via slot 620b and slot 630b. For example, slot 620b presents an image 622b, a title 624b, an interface bar 626b, and a preview of text from a content item 628b presented by slot 620b, respectively, from an upper boundary of slot 620b to a lower boundary of slot 620b. Similarly, based on the other page template, slot 630b presents an image 632b, a title 634b, an interface bar 636b, and a preview of text from a content item 638b presented by slot 630b, respectively, from an upper boundary of slot 630b to a lower boundary of slot 630b. However, in FIG. 6B the other dynamic page template specifies different font sizes, font alignment, and font styles for presenting various text data from content items than the other dynamic page template described in conjunction with FIG. 6A. As further described above in conjunction with FIGS. 5A and 5B, the other dynamic page template may specify formatting information of components of a content item presented via slot 620a or slot 630a (e.g., font size, font style, font placement, image aspect ratio, etc.).

Updating Dynamic Page Templates

Figure 7:
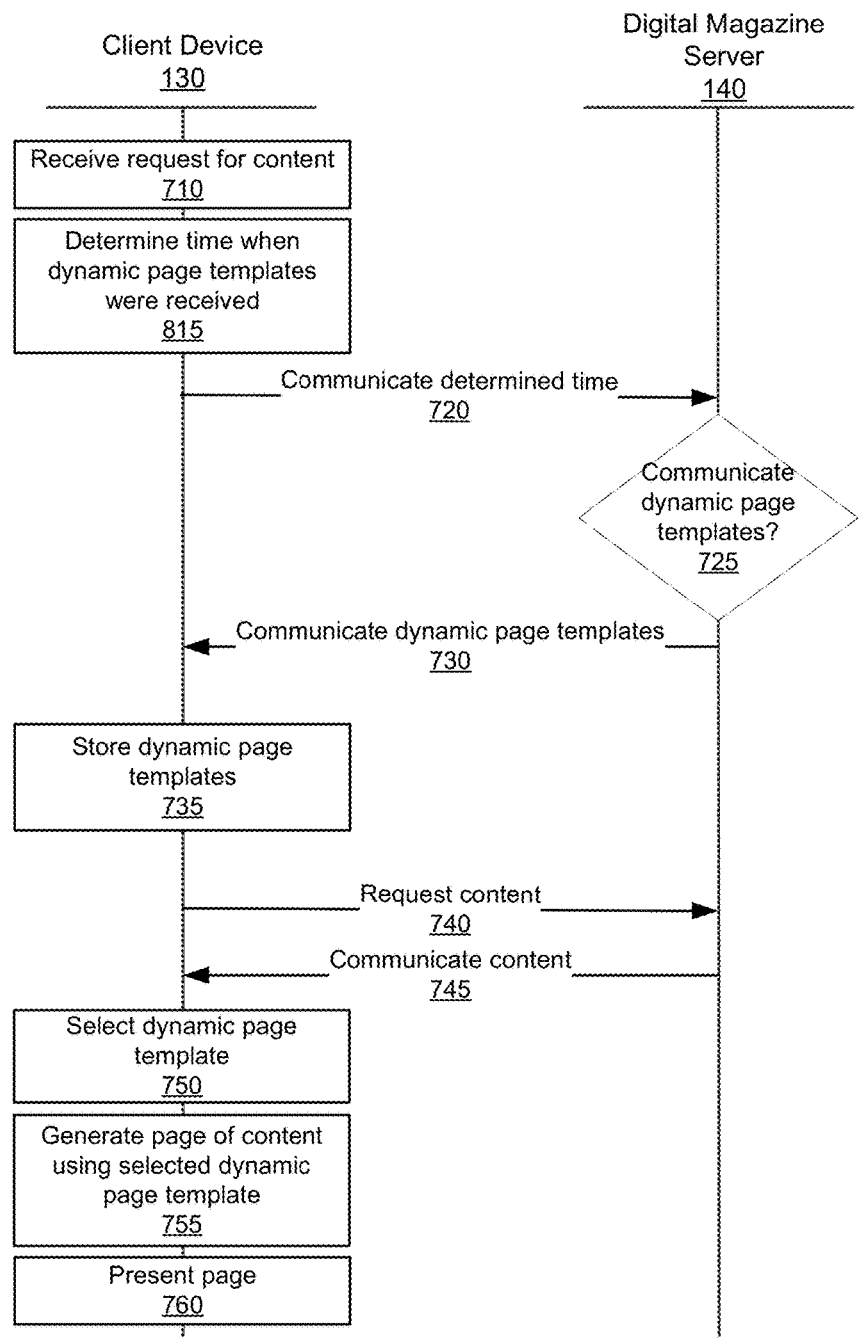
FIG. 7 is an interaction diagram of a method for obtaining updated dynamic page templates, according to an embodiment.

FIG. 7 is an interaction diagram of one embodiment of a method for updating dynamic page templates used by an application 136 executing on a client device 130 to generate content. In various embodiments, the method may include different or additional steps than those described in conjunction with FIG. 7. Additionally, in some embodiments, the method may perform steps of the method in different orders than the order described in conjunction with FIG. 7.

The client device 130 receives 710 a request for content to present to a user. For example, an application 136 associated with a digital magazine server 140 executing on the client device 130 receives a request for a page of a digital magazine from a user. The application 136 executing on the client device 130 determines 715 a time when dynamic page templates used by the application 136 were received. As described above in conjunction with FIG. 2, a digital magazine sever 140 communicates one or more dynamic page templates to the client device 130. As a dynamic page template specifies orientation of content items relative to each other within a page of a digital magazine, and may also specify formatting of characteristics of a content item presented in the page of the digital magazine, the application 136 may modify presentation of content from the digital magazine server 140 by selecting a dynamic page template. When the application 136 receives one or more dynamic page templates from the digital magazine server 140, the application 136 stores the dynamic page templates in a memory of the client device 130 and also associates a timestamp indicating when the dynamic page templates were received with the stored dynamic page templates. After receiving 710 the request for content, the application 136 determines 715 a time associated with dynamic page templates stored on the client device 130. The time may be a time associated with a most recently received dynamic page template, a time associated with a least recently received dynamic page template, or a time associated with at least a threshold number or a threshold percentage of dynamic page templates stored on the client device 130.

The application 136 communicates 720 the determined time to the digital magazine server 140, which determines 725 whether to provide dynamic page templates to the application 136 based at least in part on the determined time. In some embodiments, the application 136 communicates 720 the determined time to the digital magazine server 140 if a difference between a current time and the determined time equals or exceeds a threshold, so the application 136 communicates 720 the determined time to the digital magazine server 140 if at least a threshold amount of time has elapsed since the application 136 received dynamic page templates from the digital magazine server 140. Alternatively, the application 136 communicates 720 the determined time to the digital magazine server 140 in response to receiving 710 the request for content, regardless of the difference between the current time and the determined time.

The application 136 may determine whether one or more conditions are satisfied and communicate 720 the determined time to the digital magazine server 140 if at least a threshold number of the conditions are satisfied. For example, the application 136 determines a number of times a dynamic page template previously selected by the application 136 to generate content has been used to generate content and communicates 720 the determined time to the digital magazine server 140 if the number of times the dynamic page template previously selected by the application 136 was used to generate content equals or exceeds a threshold number of times. As another example, the application 136 determines a length of time a dynamic page template previously selected by the application 136 to generate content has been used to generate content and communicates 720 the determined time to the digital magazine server 140 if the length of time equals or exceeds a threshold duration. In another example, the application 136 determines a time when the application 136 previously received dynamic page templates from the digital magazine server 140 and communicates 720 the determined time to the digital magazine server 140 if at least a threshold amount of time has lapsed between a current time and the time when the application previously received dynamic page templates from the digital magazine server 140.

In some embodiments, the digital magazine server 140 determines 725 whether to communicate updated or additional dynamic page templates to the application 136 executing on the client device 130 based on the determined time received from the client device 130. For example, the digital magazine server 140 determines 725 whether the determined time from the client device 130 is greater than a threshold amount of time from a current time and communicates 730 one or more additional dynamic page templates to the client device 130 in response to the determined time being greater than the threshold amount of time from the current time. As another example, the digital magazine server 140 determines 725 whether the determined time from the client device 130 is prior to a time associated with one or more dynamic page templates maintained by the digital magazine server 140 (e.g., a time when the digital magazine server 140 communicated a dynamic page template to one or more client devices 130, a time when a dynamic page template was stored by the digital magazine server 140). Additionally, the digital magazine server 140 may associate an update time with the application 136 indicating a time when the digital magazine server 140 communicated one or more dynamic page templates to the application 136 and determines 725 to communicate 730 one or more dynamic page templates to the client device 130 on which the application 136 executes if the determined time from the client device 130 is prior to the update time by at least a threshold amount of time.

In some embodiments, the digital magazine server 140 determines 725 whether to communicate updated or additional dynamic page templates to the application 136 executing on the client device 130 based on the determined time received from the client device 130. For example, the digital magazine server 140 determines 725 whether the determined time from the client device 130 is greater than a threshold amount of time from a current time and communicates 730 one or more additional dynamic page templates to the client device 130 in response to the determined time being greater than the threshold amount of time from the current time. As another example, the digital magazine server 140 determines 725 whether the determined time from the client device 130 is prior to a time associated with one or more dynamic page templates maintained by the digital magazine server 140 (e.g., a time when the digital magazine server 140 communicated a dynamic page template to one or more client devices 130, a time when a dynamic page template was stored by the digital magazine server 140). Additionally, the digital magazine server 140 may associate an update time with the application 136 indicating a time when the digital magazine server 140 communicated one or more dynamic page templates to the application 136 and determines 725 to communicate 730 one or more dynamic page templates to the client device 130 on which the application 136 executes if the determined time from the client device 130 is prior to the update time by at least a threshold amount of time.

In response to determining 725 to communicate one or more dynamic page templates to the application 136, the digital magazine server 140 communicates 730 one or more dynamic page templates to the client device 130. The digital magazine server 140 may communicate 730 dynamic page templates associated with times subsequent to the determined time received from the client device 130 in some embodiments. Alternatively, the digital magazine server 140 communicates 720 multiple dynamic page templates to the client device 130, regardless of times associated with the dynamic page templates. If the digital magazine server 140 determines 725 not to communicate one or more dynamic page templates, no dynamic page templates are communicated from the digital magazine server 140 to the client device 130.

Dynamic page templates received from the digital magazine server 140 are stored 735 on the client device 130 by the application 136. In some embodiments, when storing 735 the dynamic page templates received from the digital magazine server 140, the application 136 removes one or more dynamic page templates already stored on the client device 130. For example, the application 136 identifies dynamic page templates stored on the client device 130 associated with a times greater than a threshold time interval from a current time and removes the identified dynamic page templates from the client device 130. As another example, the application 136 identifies dynamic page templates stored on the client device 130 and used to present content items greater than a threshold number of times within a specified time interval and removes the identified dynamic page templates from the client device 130.

After storing 735 dynamic page templates received from the digital magazine server 140, if dynamic page templates are received, the application 136 executing on the client device 130 requests 740 content from the digital magazine server 140 for presentation to the user. The digital magazine server 140 communicates 745 content to the client device 130, where the application 136 selects 750 a dynamic page template and generates 755 a page of content for presentation to the user based on the selected dynamic page template and the received content. As further described above in conjunction with FIGS. 2-6B, the selected dynamic page template is a data dictionary identifying variables used by the dynamic page template specifying characteristics of data for presentation to a user; hence, the application 136 generates 755 the page of content by replacing variables in the selected dynamic page template with characteristics or values from the content. In some embodiments, the application 136 selects 750 a dynamic page template that identifies additional dynamic page templates associated with one or more slots in the dynamic page template and generates 755 the page of content using the selected dynamic page template and the additional dynamic page templates. Subsequently, the application 136 presents 760 the generated page of content to the user via a display device 132 of the client device 130.

In some embodiments, the application 136 requests dynamic page templates from the digital magazine server 140 after selecting 750 a dynamic page template to generate 755 the page. The request may include a time when the application 136 selected 750 the selected dynamic page template and information identifying the selected dynamic page template, and the digital magazine server 140 determines whether to communicate one or more dynamic page templates to the application 136 if greater than a threshold amount of time has lapsed between modification of the selected dynamic page template and the time when the application 136 selected 750 the selected dynamic page template. If greater than the threshold amount of time has lapsed between modification of the selected dynamic page template and the time when the application 136 selected 750 the selected dynamic page template, the digital magazine server 140 communicates a modified version of the selected dynamic page template or an alternative dynamic page template to the application 136. Alternatively, the request includes information identifying the selected dynamic page template and a number of times the selected dynamic page template has been used by the application 136 to generate 755 pages of content within a specified time interval. If the selected dynamic page template has been used by the application 136 to generate 755 pages at least a threshold number of times within the specified time interval, the digital magazine server 140 communicates one or more additional dynamic page templates, or a modified version of the selected dynamic page template to the application 136.

In other embodiments, the digital magazine server 140 communicates dynamic page templates to the client device 130 on which the application 136 executes without receiving a request from the application 130. Hence, the digital magazine server 140 may push dynamic page templates to the client device 130 for use by the application 136. For example, the digital magazine server 140 stores information identifying the application 136 and a time when the digital magazine server 140 previously communicates dynamic page templates to the application 136. If greater than a threshold amount of time has lapsed between a the time stored by the digital magazine server 140 and a current time, the digital magazine server 140 communicates one or more dynamic page templates to a client device 130 on which the application 136 executes. Alternatively, the digital magazine server 140 communicates dynamic page templates to the client device 130 on which the application 136 executes when dynamic page templates are stored on the digital magazine server 140.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    generating, by native code of an application executing on a client device, a first user interface based on a first dynamic template, the first dynamic template specifying a first set of text formatting information, the first user interface including one or more text elements formatted according to the first set of text formatting information;
    determining a number of times the first dynamic template has been used by the application;
    communicating, from the application to a digital magazine server providing content for presentation by the application, a status of the first dynamic template in response to the number of times the first dynamic template has been used by the application equaling or exceeding a threshold number of times;
    receiving a second dynamic template from the digital magazine server, the second dynamic page template specifying a second set of text formatting information different from the first set of text formatting information and the second dynamic page template associated with a time later than a time included in the status of the first dynamic template;
    generating, by the native code of the application, a second user interface based on the second dynamic page template, the second user interface including the one or more text elements formatted according to the second set of text formatting information; and
    presenting the second user interface using a display device of the client device.

2. The method of claim 1, wherein the status of the first dynamic template comprises a timestamp indicating a time when the first dynamic template was received from the digital magazine server.

3. The method of claim 2, wherein the status of the first dynamic template is communicated in response to a difference between a current time and the time the first dynamic page template was received equaling or exceeding a threshold amount.

4. The method of claim 1, further comprising:
    determining a length of time the first dynamic template has been used by the application,
    wherein the status of the first dynamic template is communicated in response to the length of time equaling or exceeding a threshold.

5. The method of claim 1, wherein communicating the status of the first dynamic template is in response to generating the first user interface.

6. The method of claim 1, further comprising:
    removing the first dynamic template stored in a memory of the client device; and
    storing the second dynamic template in the memory of the client device.

7. The method of claim 1, wherein the text formatting information comprises a font size.

8. The method of claim 1, wherein the text formatting information comprises a font style.

9. The method of claim 1, wherein the text formatting information comprises a font type.

10. The method of claim 1, wherein the text formatting information comprises an alignment of one or more text elements.

11. The method of claim 1, wherein the text formatting information comprises placement of a text element overlaid on an image element.

12. The method of claim 1, wherein the second dynamic template is received in response to a determination that a status of the second dynamic template is more current than the status of the first dynamic template.

13. A computer program product comprising a non-transitory computer readable storage medium having instructions encoded thereon that, when executed by a processor, cause the processor to:
    generate, by native code of an application executing on a client device, a first user interface based on a first dynamic template, the first dynamic template specifying a first set of text formatting information, the first user interface including one or more text elements formatted according to the first set of text formatting information;
    determine a number of times the first dynamic template has been used by the application;
    communicate, from the application to a digital magazine server providing content for presentation by the application, a status of the first dynamic template in response to the number of times the first dynamic template has been used by the application equaling or exceeding a threshold number of times;
    receive a second dynamic template from the digital magazine server, the second dynamic page template specifying a second set of text formatting information different from the first set of text formatting information and the second dynamic page template associated with a time later than a time included in the status of the first dynamic template;
    store the received one or more dynamic page templates in a memory of the client device;
    receive, at the client device, content from the digital magazine server for presentation by the application;
    select a dynamic page template from the received one or more dynamic page templates;
    generate, by the native code of the application, a second user interface based on the second dynamic page template, the second user interface including the one or more text elements formatted according to the second set of text formatting information; and
    present the second user interface using a display device of the client device.

14. The computer program product of claim 13, wherein the status of the first dynamic template comprises a timestamp indicating a time when the first dynamic template was received from the digital magazine server.

15. The computer program product of claim 14, wherein the status of the first dynamic template is communicated response to a difference between a current time and the time the first dynamic page template was received equaling or exceeding a threshold amount.

16. The computer program product of claim 13, wherein the instructions further cause the processor to:
- determine a length of time the first dynamic template has been used by the application,
- wherein the status of the first dynamic template is communicated in response to the length of time equaling or exceeding a threshold.

17. The computer program product of claim 13, wherein communicating the status of the first dynamic template in response to generating the first user interface.

18. The computer program product of claim 13, wherein the instructions further cause the processor to:
- remove the first dynamic template stored in a memory of the client device; and
- storing the second dynamic template in the memory of the client device.

* * * * *